(12) United States Patent
Jang et al.

(10) Patent No.: US 7,876,731 B2
(45) Date of Patent: Jan. 25, 2011

(54) METHOD AND APPARATUS FOR ACQUIRING CODE GROUP IN ASYNCHRONOUS WIDEBAND CODE DIVISION MULTIPLE ACCESS SYSTEM USING RECEIVER DIVERSITY

(75) Inventors: Woo-Jin Jang, Youngdeungpo-gu (KR); Hong-Woo Lee, Bundang-gu (KR)

(73) Assignees: Pantech Co., Ltd., Seoul (KR); SK Telecom Co., Ltd., Seoul (KR)

( * ) Notice: Subject to any disclaimer, the term of this patent is extended or adjusted under 35 U.S.C. 154(b) by 1181 days.

(21) Appl. No.: 11/321,239

(22) Filed: Dec. 29, 2005

(65) Prior Publication Data

US 2006/0140155 A1 Jun. 29, 2006

(30) Foreign Application Priority Data

Dec. 29, 2004 (KR) .................. 10-2004-0114702

(51) Int. Cl.
*H04B 7/216* (2006.01)

(52) U.S. Cl. .................. 370/335; 370/342; 370/350; 370/320; 370/503; 375/354; 375/347; 375/149; 375/150; 375/147

(58) Field of Classification Search ............... 370/335, 370/209, 342, 350, 503, 514; 375/145, 149
See application file for complete search history.

(56) References Cited

U.S. PATENT DOCUMENTS

| | | | | |
|---|---|---|---|---|
| 6,185,244 | B1 * | 2/2001 | Nystrom et al. ............ | 375/145 |
| 6,571,099 | B1 * | 5/2003 | Kim et al. .................. | 455/442 |
| 6,990,091 | B2 * | 1/2006 | Sarkar ....................... | 370/342 |
| 7,102,994 | B2 * | 9/2006 | Sezgin et al. ............... | 370/209 |

(Continued)

FOREIGN PATENT DOCUMENTS

GB 002368753 * 3/2001

(Continued)

OTHER PUBLICATIONS

European Extended Search Report dated Apr. 4, 2006 in respect to European Application No. 05028276.3-2411.

(Continued)

*Primary Examiner*—Rafael Pérez-Gutiérrez
*Assistant Examiner*—German Viana Di Prisco
(74) *Attorney, Agent, or Firm*—H.C. Park & Associates, PLC

(57) ABSTRACT

Disclosed herein are a method and apparatus for acquiring a code group in an asynchronous Wideband Code Division Multiple Access (WCDMA) system. A primary synchronization channel search unit achieves primary synchronization channel slot timing synchronization. Then, the 1-1 search unit and 1-2 search unit of a secondary synchronization channel receive secondary synchronization channels from first and second antennas, respectively, start correlation operations between some of the slots of the received channels and code group candidates, and transmit information about candidates having values exceeding a predetermined threshold value to a determination unit. The determination unit transmits the received information about candidates to a second search unit of the secondary synchronization channel. The second search unit of the secondary synchronization channel calculates correlation characteristics based on the received information about candidates and selects a code group candidate having a highest correlation characteristic.

11 Claims, 5 Drawing Sheets

U.S. PATENT DOCUMENTS

| | | | |
|---|---|---|---|
| 7,110,782 B2 * | 9/2006 | Yamaguchi | 455/502 |
| 7,126,981 B2 * | 10/2006 | Ho et al. | 375/147 |
| 7,142,526 B1 * | 11/2006 | Hokao | 370/331 |
| 7,158,505 B2 * | 1/2007 | Dick et al. | 370/350 |
| 7,187,707 B2 * | 3/2007 | Ho et al. | 375/145 |
| 7,224,718 B2 * | 5/2007 | Chang et al. | 375/145 |
| 7,386,006 B2 * | 6/2008 | Rimi et al. | 370/464 |
| 2001/0048714 A1 * | 12/2001 | Jha | 375/150 |
| 2002/0097705 A1 * | 7/2002 | Sezgin et al. | 370/347 |
| 2003/0108135 A1 * | 6/2003 | Frigon | 375/354 |
| 2004/0142712 A1 * | 7/2004 | Rudolf | 455/502 |
| 2008/0144583 A1 * | 6/2008 | Litwin et al. | 370/336 |

FOREIGN PATENT DOCUMENTS

| | | | |
|---|---|---|---|
| GB | 2368753 A | * | 5/2002 |

OTHER PUBLICATIONS

Hiramatsu et al. "Transmit Diversity Applied on the CDMA/TDD Cellular Systems". IEEE Technology Conference, New York, NY, IEEE, US. vol. 2 of 3 Conf. 51, May 15, 2000, pp. 1170-1174.

Sawahashi et al. "Improvements in W-CDMA: Principles and Experimental Results". Annals of Telecommunications, vol. 56, No. 5/6 (May 2001), pp. 236-259.

* cited by examiner

FIG. 4A

| Scrambling code group | Slot number | | | | | | | | | | | | | | |
|---|---|---|---|---|---|---|---|---|---|---|---|---|---|---|---|
| | #0 | #1 | #2 | #3 | #4 | #5 | #6 | #7 | #8 | #9 | #10 | #11 | #12 | #13 | #14 |
| Group0 | 1 | 1 | 2 | 8 | 9 | 10 | 15 | 8 | 10 | 16 | 2 | 7 | 15 | 7 | 16 |
| Group1 | 1 | 1 | 5 | 16 | 7 | 3 | 14 | 16 | 3 | 10 | 5 | 12 | 14 | 12 | 10 |
| Group2 | 1 | 2 | 1 | 15 | 5 | 5 | 12 | 16 | 6 | 11 | 2 | 16 | 11 | 15 | 12 |
| Group3 | 1 | 2 | 3 | 1 | 8 | 6 | 5 | 2 | 5 | 8 | 4 | 4 | 6 | 3 | 7 |
| Group4 | 1 | 2 | 16 | 6 | 6 | 11 | 15 | 5 | 12 | 1 | 15 | 12 | 16 | 11 | 2 |
| Group5 | 1 | 3 | 4 | 7 | 4 | 1 | 5 | 5 | 3 | 6 | 2 | 8 | 7 | 6 | 8 |
| Group6 | 1 | 4 | 11 | 3 | 4 | 10 | 9 | 2 | 11 | 2 | 10 | 12 | 12 | 9 | 3 |
| Group7 | 1 | 5 | 6 | 6 | 14 | 9 | 10 | 2 | 13 | 9 | 2 | 5 | 14 | 1 | 13 |
| Group8 | 1 | 6 | 10 | 10 | 4 | 11 | 7 | 13 | 16 | 11 | 13 | 6 | 4 | 1 | 16 |
| Group9 | 1 | 6 | 13 | 2 | 14 | 2 | 6 | 5 | 5 | 13 | 10 | 9 | 1 | 14 | 10 |
| Group10 | 1 | 7 | 8 | 5 | 7 | 2 | 4 | 3 | 8 | 3 | 2 | 6 | 6 | 4 | 5 |
| Group11 | 1 | 7 | 10 | 9 | 16 | 7 | 9 | 15 | 1 | 8 | 16 | 8 | 15 | 2 | 2 |
| Group12 | 1 | 8 | 12 | 9 | 9 | 4 | 13 | 16 | 5 | 1 | 13 | 5 | 12 | 4 | 8 |
| Group13 | 1 | 8 | 14 | 10 | 14 | 1 | 15 | 15 | 8 | 5 | 11 | 4 | 10 | 5 | 4 |
| Group14 | 1 | 9 | 2 | 15 | 15 | 16 | 10 | 7 | 8 | 1 | 10 | 8 | 2 | 16 | 9 |
| Group15 | 1 | 9 | 15 | 6 | 16 | 2 | 13 | 14 | 10 | 11 | 7 | 4 | 5 | 12 | 3 |
| Group16 | 1 | 10 | 9 | 11 | 15 | 7 | 6 | 4 | 16 | 5 | 2 | 12 | 13 | 3 | 14 |
| Group17 | 1 | 11 | 14 | 4 | 13 | 2 | 9 | 10 | 12 | 16 | 8 | 5 | 3 | 15 | 6 |
| Group18 | 1 | 12 | 12 | 13 | 14 | 7 | 2 | 8 | 14 | 2 | 1 | 13 | 11 | 8 | 11 |
| Group19 | 1 | 12 | 15 | 5 | 4 | 14 | 3 | 16 | 7 | 8 | 6 | 2 | 10 | 11 | 13 |
| Group20 | 1 | 15 | 4 | 3 | 7 | 6 | 10 | 13 | 12 | 5 | 14 | 16 | 8 | 2 | 11 |
| Group21 | 1 | 16 | 3 | 12 | 11 | 9 | 13 | 5 | 6 | 2 | 14 | 7 | 4 | 10 | 15 |
| Group22 | 2 | 2 | 5 | 10 | 16 | 11 | 3 | 10 | 11 | 8 | 5 | 13 | 3 | 13 | 8 |
| Group23 | 2 | 2 | 12 | 3 | 15 | 5 | 8 | 3 | 5 | 14 | 12 | 9 | 8 | 9 | 14 |
| Group24 | 2 | 3 | 6 | 16 | 12 | 16 | 3 | 13 | 13 | 6 | 7 | 9 | 2 | 12 | 7 |
| Group25 | 2 | 3 | 8 | 2 | 9 | 15 | 14 | 3 | 14 | 9 | 5 | 5 | 15 | 8 | 12 |
| Group26 | 2 | 4 | 7 | 9 | 5 | 4 | 9 | 11 | 2 | 14 | 5 | 14 | 11 | 16 | 16 |
| Group27 | 2 | 4 | 13 | 12 | 12 | 7 | 15 | 10 | 5 | 2 | 15 | 5 | 13 | 7 | 4 |
| Group28 | 2 | 5 | 9 | 9 | 3 | 12 | 8 | 14 | 15 | 12 | 14 | 5 | 3 | 2 | 15 |
| Group29 | 2 | 5 | 11 | 7 | 2 | 11 | 9 | 4 | 16 | 7 | 16 | 9 | 14 | 14 | 4 |
| Group30 | 2 | 6 | 2 | 13 | 3 | 3 | 12 | 9 | 7 | 16 | 6 | 9 | 16 | 13 | 12 |
| Group31 | 2 | 6 | 9 | 7 | 7 | 16 | 13 | 3 | 12 | 2 | 13 | 12 | 9 | 16 | 6 |
| Group32 | 2 | 7 | 12 | 15 | 2 | 12 | 4 | 10 | 13 | 15 | 13 | 4 | 5 | 5 | 10 |

FIG. 4B

| Scrambling code group | Slot number | | | | | | | | | | | | | | |
|---|---|---|---|---|---|---|---|---|---|---|---|---|---|---|---|
| | #0 | #1 | #2 | #3 | #4 | #5 | #6 | #7 | #8 | #9 | #10 | #11 | #12 | #13 | #14 |
| Group33 | 2 | 7 | 14 | 16 | 5 | 9 | 2 | 9 | 16 | 11 | 11 | 5 | 7 | 4 | 14 |
| Group34 | 2 | 8 | 5 | 12 | 5 | 2 | 14 | 14 | 8 | 15 | 3 | 9 | 12 | 15 | 9 |
| Group35 | 2 | 9 | 13 | 4 | 2 | 13 | 8 | 11 | 6 | 4 | 6 | 8 | 15 | 15 | 11 |
| Group36 | 2 | 10 | 3 | 2 | 13 | 16 | 8 | 10 | 8 | 13 | 11 | 11 | 16 | 3 | 5 |
| Group37 | 2 | 11 | 15 | 3 | 11 | 6 | 14 | 10 | 15 | 10 | 6 | 7 | 7 | 14 | 3 |
| Group38 | 2 | 16 | 4 | 5 | 16 | 14 | 7 | 11 | 4 | 11 | 14 | 9 | 9 | 7 | 5 |
| Group39 | 3 | 3 | 4 | 6 | 11 | 12 | 13 | 6 | 12 | 14 | 4 | 5 | 13 | 5 | 14 |
| Group40 | 3 | 3 | 6 | 5 | 16 | 9 | 15 | 5 | 9 | 10 | 6 | 4 | 15 | 4 | 10 |
| Group41 | 3 | 4 | 5 | 14 | 4 | 6 | 12 | 13 | 5 | 13 | 6 | 11 | 11 | 12 | 14 |
| Group42 | 3 | 4 | 9 | 16 | 10 | 4 | 16 | 15 | 3 | 5 | 10 | 5 | 15 | 6 | 6 |
| Group43 | 3 | 4 | 16 | 10 | 5 | 10 | 4 | 9 | 9 | 16 | 15 | 6 | 3 | 5 | 15 |
| Group44 | 3 | 5 | 12 | 11 | 14 | 5 | 11 | 13 | 3 | 6 | 14 | 6 | 13 | 4 | 4 |
| Group45 | 3 | 6 | 4 | 10 | 6 | 5 | 9 | 15 | 4 | 15 | 5 | 16 | 16 | 9 | 10 |
| Group46 | 3 | 7 | 8 | 8 | 16 | 11 | 12 | 4 | 15 | 11 | 4 | 7 | 16 | 3 | 15 |
| Group47 | 3 | 7 | 16 | 11 | 4 | 15 | 3 | 15 | 11 | 12 | 12 | 4 | 7 | 8 | 16 |
| Group48 | 3 | 8 | 7 | 15 | 4 | 8 | 15 | 12 | 3 | 16 | 4 | 16 | 12 | 11 | 11 |
| Group49 | 3 | 8 | 15 | 4 | 16 | 4 | 8 | 7 | 7 | 15 | 12 | 11 | 3 | 16 | 12 |
| Group50 | 3 | 10 | 10 | 15 | 16 | 5 | 4 | 6 | 16 | 4 | 3 | 15 | 9 | 6 | 9 |
| Group51 | 3 | 13 | 11 | 5 | 4 | 12 | 4 | 11 | 6 | 6 | 5 | 3 | 14 | 13 | 12 |
| Group52 | 3 | 14 | 7 | 9 | 14 | 10 | 13 | 8 | 7 | 8 | 10 | 4 | 4 | 13 | 9 |
| Group53 | 5 | 5 | 8 | 14 | 16 | 13 | 6 | 14 | 13 | 7 | 8 | 15 | 6 | 15 | 7 |
| Group54 | 5 | 6 | 11 | 7 | 10 | 8 | 5 | 8 | 7 | 12 | 12 | 10 | 6 | 9 | 11 |
| Group55 | 5 | 6 | 13 | 8 | 13 | 5 | 7 | 7 | 6 | 16 | 14 | 15 | 8 | 16 | 15 |
| Group56 | 5 | 7 | 9 | 10 | 7 | 11 | 6 | 12 | 9 | 12 | 11 | 8 | 8 | 6 | 10 |
| Group57 | 5 | 9 | 6 | 8 | 10 | 9 | 8 | 12 | 5 | 11 | 10 | 11 | 12 | 7 | 7 |
| Group58 | 5 | 10 | 10 | 12 | 8 | 11 | 9 | 7 | 8 | 9 | 5 | 12 | 6 | 7 | 6 |
| Group59 | 5 | 10 | 12 | 6 | 5 | 12 | 8 | 9 | 7 | 6 | 7 | 8 | 11 | 11 | 9 |
| Group60 | 5 | 13 | 15 | 15 | 14 | 8 | 6 | 7 | 16 | 8 | 7 | 13 | 14 | 5 | 16 |
| Group61 | 9 | 10 | 13 | 10 | 11 | 15 | 15 | 9 | 16 | 12 | 14 | 13 | 16 | 14 | 11 |
| Group62 | 9 | 11 | 12 | 15 | 12 | 9 | 13 | 13 | 11 | 14 | 10 | 16 | 15 | 14 | 16 |
| Group63 | 9 | 12 | 10 | 15 | 13 | 14 | 9 | 14 | 15 | 11 | 11 | 13 | 12 | 16 | 10 |

METHOD AND APPARATUS FOR ACQUIRING CODE GROUP IN ASYNCHRONOUS WIDEBAND CODE DIVISION MULTIPLE ACCESS SYSTEM USING RECEIVER DIVERSITY

This application claims priority from and the benefit of Korean Patent Application No. 10-2004-0114702, filed on Dec. 29, 2004.

BACKGROUND OF THE INVENTION

1. Field of the Invention

The present invention relates generally to a method and apparatus for acquiring a code group in an asynchronous wideband code division multiple access system and, more particularly, to a method and apparatus for acquiring a code group in an asynchronous wideband code division multiple access system, in which code groups are acquired only for the first several slots using receiver diversity with respect to a synchronization channel used for cell search in the asynchronous wideband code division multiple access system, thus reducing code acquisition time and the average number of acquisition operations in an actual multi-path fading area.

2. Description of the Related Art

FIG. 3 is a diagram illustrating the configuration of a synchronization channel of wideband code division multiple access (WCDMA) that was proposed as a standard.

In an asynchronous WCDMA system, respective base stations use different codes. In this system, unlike an asynchronous WCDMA system, although a code used in one base station is shifted, the shifted code does not become a code that is used in some other base station.

In WCDMA, a synchronization channel includes a primary synchronization channel that is used for slot timing synchronization informing a mobile station having no synchronization information of the start point of every slot, and a secondary synchronization channel that is used to acquire frame timing synchronization and determine a primary scrambling code group corresponding to primary scramble codes used by respective base stations.

In WCDMA, one frame of the synchronization channel is 10 msec and is composed of a total of 15 slots. The primary synchronization channel is transmitted during the first 256 chips of each slot (2560 chips). In this case, the same codes are transmitted in respective slots, so that slot timing synchronization can be achieved. The secondary synchronization channel is transmitted during the first 256 chips of each slot (2560 chips), but one of 16 different codes is transmitted in each slot. That is, the received secondary synchronization code values of the secondary synchronization channel can be found through a secondary synchronization channel search process, and the code group of the received codes can be found. The secondary synchronization code values of secondary synchronization channel code groups are illustrated in FIGS. 4A and 4B.

In the secondary synchronization channel, 960 (64*15=960) cases where 64 code groups are L-slot (L=0, 1, 2, 3, 4, . . . , 14)-shifted can be candidates for code group acquisition and frame timing synchronization. A candidate having the highest energy value is determined by comparing a received secondary synchronization channel and a total of 960 candidates, and correlation values with the received secondary synchronization channel are acquired for 15 slot values per candidate. That is, since correlation values corresponding to the length of the 256 chips of one slot value are acquired, correlation operations corresponding to 256 chips*15 slots are necessary for each candidate. Therefore, there occur problems in that a large number of operations, a long search time and a large amount of power consumption are required.

To mitigate the problems, there have been proposed a method of performing calculations on some of the 15 slots of a total of 960 candidates and then performing a sufficient number of operations only on possible candidates for 15 slots, and a method of first acquiring the secondary synchronization code values of the 15 slots of a received secondary synchronization channel and performing pre-processing based on the acquired values, thereby reducing the time that is taken for code group acquisition. However, these methods are disadvantageous in that the expected effect of saving search time cannot be achieved because, in the case where only one antenna is used when calculations are first performed on some of the slots, signals collide against buildings several times in a multi-path fading environment such as in urban centers and, therefore, received signals has been weakened or attenuated. Furthermore, if the receiver diversity for enhancing the reception performance of a terminal by processing signals, which are received through two conventional antennas and a reception Radio Frequency (RF) circuit, in a Digital Signal Processor (DSP) is applied to all of the slots without change, there occur problems in that the number of operations and the amount of current assumption are increased.

SUMMARY OF THE INVENTION

Accordingly, the present invention has been made keeping in mind the above problems occurring in the prior art, and an object of the present invention is to provide a method and apparatus for acquiring a code group in an asynchronous WCDMA system, in which calculations are performed only on some of the 15 slots of 960 code group candidates and operations are sufficiently performed only on possible candidates for 15 or more slots using the characteristics of the code groups, thus reducing a large number of operations, a long search time and a large amount of power consumption.

Another object of the present invention is to provide a method and apparatus for acquiring a code group in an asynchronous WCDMA system, which apply receiver diversity to a process in which operations are first performed on some of the 15 slots, and if any one of signals received through two antennas exceeds a predetermined threshold value, perform a sufficient number of operations, wherein only one desired signal received through the two antennas is selected and processed, thus minimizing the number of operations and the amount of current consumption that may be caused due to the receiver diversity.

In order to accomplish the above objects, the present invention provides a method of acquiring a code group in an asynchronous WCDMA system, including a first step at which a primary synchronization channel search unit achieves primary synchronization channel slot timing synchronization; a second step at which, if the primary synchronization channel slot timing synchronization is achieved, the 1-1 search unit of a secondary synchronization channel receives a secondary synchronization channel from a first antenna, starts correlation operations between some of the slots of the received channel and code group candidates, and transmits information about candidates having values exceeding a predetermined threshold value to a determination unit; a third step at which, if the primary synchronization channel slot timing synchronization is achieved, the 1-2 search unit of the secondary synchronization channel receives a secondary synchronization channel from a second antenna, starts correlation operations between some of the slots of the received channel and code group candidates, and transmits information about candidates having values exceeding a predetermined threshold value to the determination unit; a fourth step at which the determination unit transmits the information about the candidates, which has been received at the second and third steps, to a second search unit of the secondary synchronization channel; and a fifth step at which the second search unit of the secondary synchronization channel calculates correlation characteristics based on the information about the candidates, which has been received from the determination unit, and selects a code group candidate having a highest correlation characteristic.

Preferably, the slots are 15 in number; and the second and third steps are performed in such way as to start correlation operations between some of the 15 slots and the code group candidates while applying a receiver diversity function to the slots, and transmit information about candidates to the determination unit if there are the candidates having values exceeding a predetermined threshold value.

Preferably, at the fourth step, the determination unit transmits information about candidates to the second search unit of the secondary synchronization channel if there is the information about the candidates that is received from either the 1-1 search unit or the 1-2 search unit of the secondary synchronization channel. At this step, it is preferred that the determination unit transmit the signal of the 1-1 search unit or 1-2 search unit of the secondary synchronization channel, which has transmitted the information about the candidates, to the second search unit of the secondary synchronization channel. Meanwhile, when information about the same candidate is received from both the 1-1 search unit and 1-2 search unit of the secondary synchronization channel, the determination unit transmits a signal having a higher correlation operation value to the second search unit of the secondary synchronization channel.

Additionally, the present invention provides an apparatus for acquiring a code group in an asynchronous WCDMA system, including a primary synchronization channel search unit for informing a mobile station of a slot start point; the 1-1 search unit of a secondary synchronization channel for, if primary synchronization channel slot timing synchronization is achieved, starting correlation operations between some of the slots of the secondary synchronization channel, which has been received through a first antenna, and code group candidates, and transmitting information about candidates having values exceeding a predetermined threshold value to a determination unit; the 1-2 search unit of the secondary synchronization channel for, if primary synchronization channel slot timing synchronization is achieved, starting correlation operations between some of the slots of the secondary synchronization channel, which has been received through a second antenna, and code group candidates, and transmitting information about candidates having values exceeding a predetermined threshold value to a determination unit; a determination unit for transmitting the information about the candidates, which has been received from the 1-1 search unit and 1-2 search unit of the secondary synchronization channel, to a second search unit of the secondary synchronization channel; and the second search unit of the secondary synchronization channel for calculating correlation characteristics based on the information about the candidates received from the determination unit, and selecting a code group candidate having a highest correlation characteristic.

Preferably, if there is information about candidates that is received from either the 1-1 search unit or the 1-2 search unit of the secondary synchronization channel, the determination unit transmits the information about the candidates to the second search unit of the secondary synchronization channel. At this time, it is preferred that the determination unit transmit the signal of the 1-1 search unit or 1-2 search unit of the secondary synchronization channel, which has transmitted information about candidates, to the second search unit of the secondary synchronization channel.

Meanwhile, when information about the same candidate is received from both the 1-1 search unit and 1-2 search unit of the secondary synchronization channel, it is preferred that the determination unit transmit a signal having a higher correlation operation value to the second search unit of the secondary synchronization channel.

Meanwhile, the 1-1 search unit and 1-2 search unit of the secondary synchronization channel can directly transmit information about candidates and a signal to the second search unit of the secondary synchronization channel without intervention of the determination unit. That is, if primary synchronization channel slot timing synchronization is achieved, the 1-1 search unit and 1-2 search unit of the secondary synchronization channel can receive secondary synchronization channels from the first and second antennas, start correlation operations between some of the slots of the received channel and code group candidates, and transmit information about candidates having values exceeding a predetermined threshold value to the second search unit of the secondary synchronization channel. Then, the second search unit of the secondary synchronization channel calculates correlation characteristics, based on the information about the candidates, which has been received from the second search unit of the secondary synchronization channel, and selects a candidate having the highest correlation characteristic.

In this case, it is preferred that the 1-1 search unit and 1-2 search unit of the secondary synchronization channel can also transmit a secondary synchronization channel signal, which has been received from a corresponding antenna, to the second search unit of the secondary synchronization channel when transmitting the information about the candidates. Meanwhile, it is preferred that the second search unit of the secondary synchronization channel use a signal having a higher correlation operation value when information and a signal about the same candidate is received from both the 1-1 search unit and 1-2 search unit of the secondary synchronization channel.

BRIEF DESCRIPTION OF THE DRAWINGS

The above and other objects, features and advantages of the present invention will be more clearly understood from the following detailed description taken in conjunction with the accompanying drawings, in which:

FIGS. 4A and 4B are tables illustrating secondary synchronization code values of a secondary synchronization channel code group.

DESCRIPTION OF THE PREFERRED EMBODIMENTS

The present invention will now be described in detail in connection with preferred embodiments with reference to the accompanying drawings.

Figure 1:
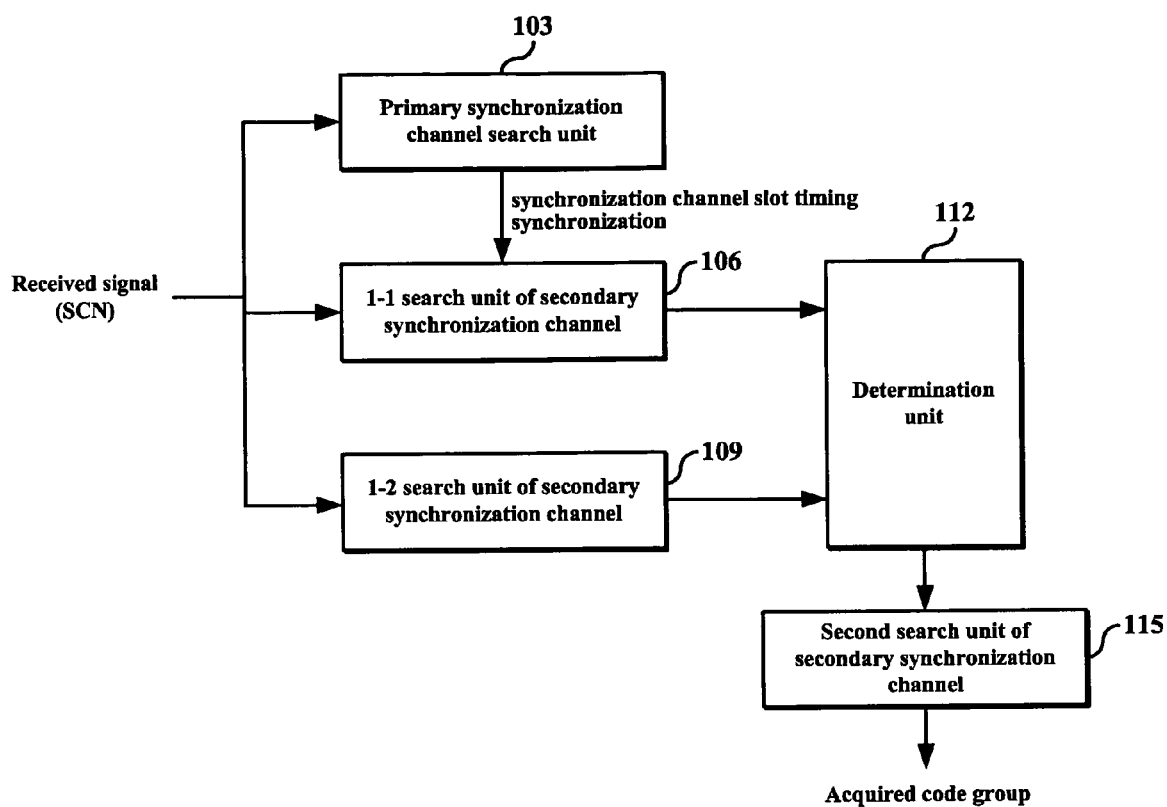
FIG. 1 is a view illustrating the construction of a code group acquisition apparatus using receiver diversity according to the present invention.

FIG. 1 is a view illustrating the construction of a code group acquisition apparatus using receiver diversity according to the present invention.

A primary synchronization channel functions to inform a mobile station having no synchronization information of a slot start point. That is, a synchronization channel received from a base station achieves synchronization channel slot timing synchronization while passing through a primary synchronization channel search unit 103. The primary synchronization channel is composed of a 10 msec frame. One frame is composed of 15 slots. A code having a length of 256 bits is repeatedly transmitted in each time slot. The same code is used in all of the base stations, and is repeatedly transmitted in the forepart of each slot. A mobile station that has searched for a primary synchronization channel having the best signal achieves slot synchronization and then searches for a secondary synchronization channel.

The secondary synchronization channel employs different codes for respective slots. In the secondary synchronization channel, 64 orthogonal codes, each having a length of 256 bits, can be employed. The secondary synchronization channel provides notification of the code group of a base station to which the secondary synchronization channel belongs, through a combination of orthogonal codes assigned to respective slots.

A signal received from a first antenna is applied to the 1-1 search unit 106 of the secondary synchronization channel. The 1-1 search unit 106 of the secondary synchronization channel starts correlation operations between some of the slots of the secondary synchronization channel, which has been received through the first antenna, and 960 code group candidates, and transmits information about candidates to a determination unit 112 if there are the candidates that have values exceeding a predetermined threshold value. At this time, it is preferable to transmit the signals of the corresponding candidates to the determination unit 112, along with the information about the candidates. The signals of the secondary synchronization channel, which are received by the first antenna, and the signals of the secondary synchronization channel, which are received by a second antenna, can always be transmitted to the determination unit 112.

A signal received from the second antenna is applied to the 1-2 search unit 109 of the secondary synchronization channel. The 1-2 search unit 109 of the secondary synchronization channel starts correlation operations between some of the slots of the secondary synchronization channel, which has been received by the second antenna, and 960 code group candidates, and transmits information about candidates to the determination unit 112 if there are candidates having values exceeding the predetermined threshold value. At this time, it is preferable to transmit the signals of the corresponding candidates to the determination unit 112, along with the information about the candidates. The signals of the secondary synchronization channel, which are received by the first antenna, and the signals of the secondary synchronization channel, which are received by the second antenna, can always be transmitted to the determination unit 112.

When the determination unit 112 receives information about candidates from either the 1-1 search unit 106 or the 1-2 search unit 109 of the secondary synchronization channel, the determination unit 112 transmits information about the candidates to the second search unit 115 of the secondary synchronization channel. At this time, it is preferable to transmit the signal of the 1-1 search unit 106 or 1-2 search unit 109 of the secondary synchronization channel, which has transmitted information about the candidates, to the second search unit 115 of the secondary synchronization channel.

Meanwhile, if information about the same candidate is received from both the 1-1 search unit 106 and 1-2 search unit 109 of the secondary synchronization channel, it is preferable to transmit a signal having a higher correlation operation value to the second search unit 115 of the secondary synchronization channel.

The second search unit 115 of the secondary synchronization channel calculates the correlation characteristics of the candidates received from the determination unit 112, and selects a code group candidate having a higher correlation characteristic from among the candidates.

A code group acquisition process in an asynchronous WCDMA system will be described below.

Figure 2:
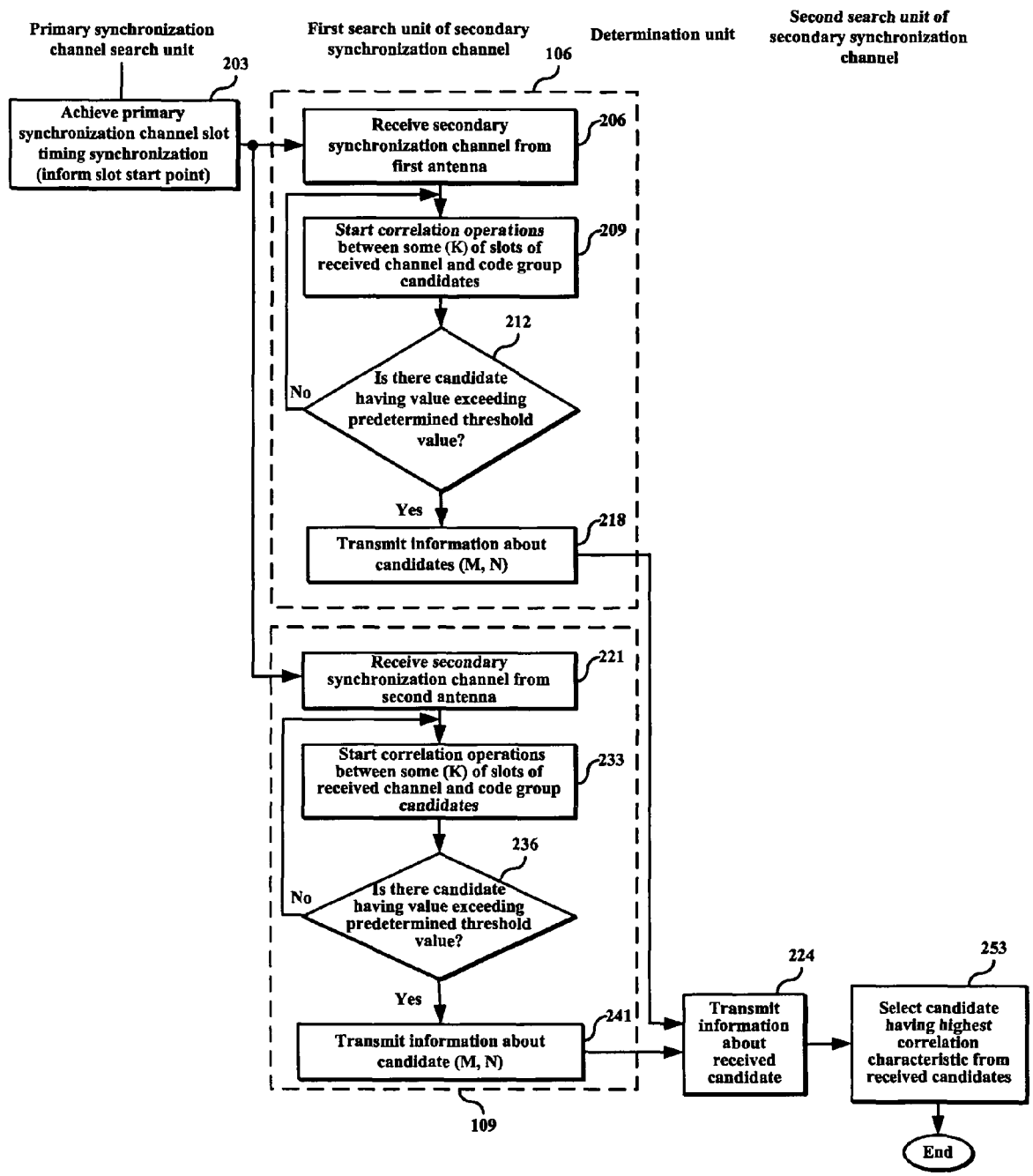
FIG. 2 is a flowchart illustrating a code group acquisition process in an asynchronous WCDMA system according to the present invention.
Figure 3:
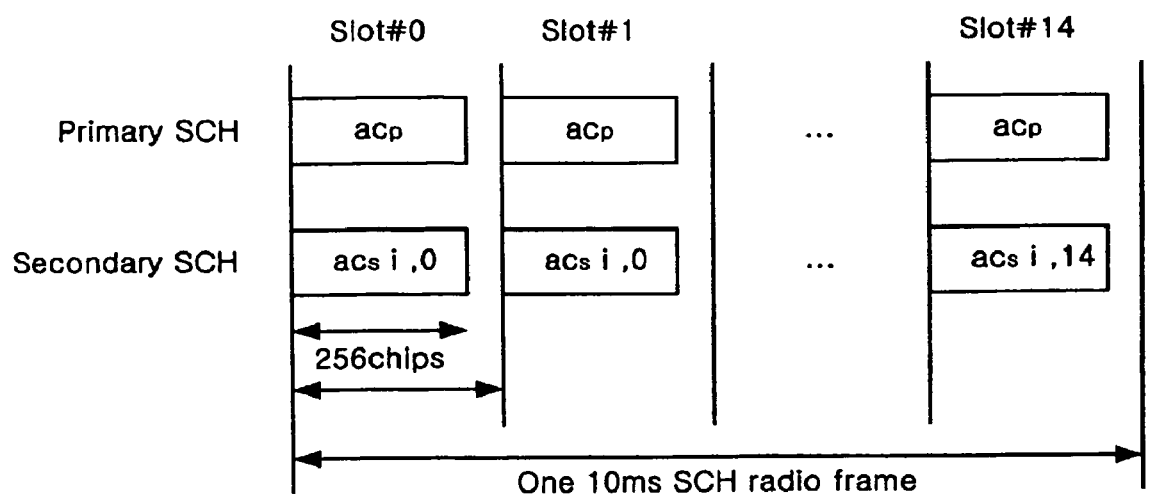
FIG. 3 is a diagram illustrating the configuration of a synchronization channel of WCDMA that was proposed as a standard.

FIG. 2 is a flowchart illustrating a code group acquisition process in an asynchronous WCDMA system according to the present invention.

The number of codes used to identify base stations in an asynchronous method is 512. The 512 codes are classified into 64 groups, and eight codes are assigned to each group. The reason why the codes are classified into several groups is to provide a mobile station having no time information with the rapidity of initial synchronization that determines the type of a code and a start point.

The primary synchronization channel search unit 103 functions to inform a mobile station having no synchronization information of a slot start point. That is, the primary synchronization channel search unit 103 achieves slot timing synchronization with a received primary synchronization channel at step 203, and the secondary synchronization channel search unit searches the secondary synchronization channel.

The search of the secondary synchronization channel is conducted to determine to which of 64 code groups the secondary synchronization channel received from a base station belong. Since frame timing synchronization has not yet been achieved at this point, 960 (64*15=960) cases that have been L-slot (L=0, 1, 2, 3, 4, . . . , 14)-shifted for the 64 code groups can be candidates for code group acquisition and frame timing synchronization.

The 1-1 search unit 106 of the secondary synchronization channel receives the secondary synchronization channel from the first antenna at step 206, and then starts correlation operations between some (K) of the 15 slots of the received channel and the 960 code group candidates at step 209. If there are candidates having values exceeding a predetermined threshold value ("YES" at step 212), the 1-1 search unit 106 transmits information about the candidates to the determination unit 112 at step 218. At this time, since there are cases where the 64 code groups are shifted 15 times, information about a code can be represented by (a code group number, a shift number) and, therefore, can be expressed by (M, N).

The 1-2 search unit 109 of the secondary synchronization channel receives the secondary synchronization channel from the second antenna at step 221, and then starts correlation operations between some (K) of the 15 slots of the received channel and the 960 code group candidates at step 233. If there is a candidate having a value exceeding a predetermined threshold value ("YES" at step 236), the 1-2 search unit 109 transmits information about the candidate to the determination unit 112 at step 241.

If the determination unit 112 receives information about code group candidates from the 1-1 search unit 106 and 1-2 search unit 109 of the secondary synchronization channel, the determination unit 112 transmits the information to the second search unit 115 of the secondary synchronization channel at step 224. If there is information about code group candidates that has been received from the 1-1 search unit 106 or 1-2 search unit 109 of the secondary synchronization channel, it is preferable to transmit the information about the code group candidates to the second search unit 115 of the secondary synchronization channel. Meanwhile, if information about the same candidate is received from both the 1-1 search unit 106 and 1-2 search unit 109 of the secondary synchronization channel, it is preferable to transmit a signal having a higher correlation operation value to the second search unit 115 of the secondary synchronization channel.

When the second search unit 115 of the secondary synchronization channel receives information about the code group candidates, the second search unit 115 of the secondary synchronization channel calculates correlation characteristics and selects a code group candidate having a higher correlation characteristic from the received code group candidates at step 253.

Meanwhile, although only the construction in which the information about the candidates having values exceeding a predetermined threshold value is transferred to the second search unit 115 of the secondary synchronization channel through the determination unit 112 has been described, the 1-1 search unit 106 and 1-2 search unit 109 of the secondary synchronization channel may transmit information about candidates having values exceeding a predetermined threshold value directly to the second search unit 115 of the secondary synchronization channel without intervention of the determination unit 112.

That is, if the primary synchronization channel slot timing synchronization is achieved, the 1-1 search unit 106 and 1-2 search unit 109 of the secondary synchronization channel receive secondary synchronization channels from the first and second antennas, start correlation operations between some of the slots of the received channel and code group candidates, and transmit information about candidates having values exceeding a predetermined threshold value to the second search unit 115 of the secondary synchronization channel. Then, the second search unit 115 of the secondary synchronization channel calculates the correlation characteristics of the received candidates and selects a candidate having the highest correlation characteristic.

In this case, when the 1-1 search unit 106 and 1-2 search unit 109 of the secondary synchronization channel transmit the candidate information, it is preferable to transit a secondary synchronization channel signal, which has been received from a corresponding antenna, to the second search unit 115 of the secondary synchronization channel. Furthermore, secondary synchronization channel signals received from two antennas may always be input to the second search unit 115 of the secondary synchronization channel. Meanwhile, when the second search unit 115 of the secondary synchronization channel receives information about the same candidate and signals from both the 1-1 search unit 106 and 1-2 search unit 109 of the secondary synchronization channel, it is preferable to use a signal having a higher correlation operation value.

As described above, in accordance with the present invention, calculations are performed only on some of the 15 slots of 960 code group candidates and operations are sufficiently performed only on possible candidates for 15 or more slots using the characteristics of the code groups, thus reducing a large number of operations, a long search time and a large amount of power consumption.

The present invention applies receiver diversity to a process in which operations are first performed on some of the 15 slots, determines that a signal has been detected if any one of signals received through two antennas exceeds a predetermined threshold value, and performs a sufficient number of operations, wherein only one desired signal received through the two antennas is selected and processed, thus minimizing the number of operations and the amount of current consumption that may be caused due to the receiver diversity.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of acquiring a code group in an asynchronous wideband code division multiple access (WCDMA) system, comprising:

a first step in which a primary synchronization channel search unit achieves primary synchronization channel slot timing synchronization;

a second step in which, if the primary synchronization channel slot timing synchronization is achieved, a 1-1 search unit receives a secondary synchronization channel from a first antenna, starts correlation operations between some of slots of the received secondary synchronization channel and code group candidates, and transmits information about code group candidates having correlation operation values exceeding a first threshold value to a second search unit;

a third step in which, if the primary synchronization channel slot timing synchronization is achieved, a 1-2 search unit receives the secondary synchronization channel from a second antenna, starts correlation operations between some of slots of the received secondary synchronization channel and code group candidates, and transmits information about code group candidates having correlation operation values exceeding a second threshold value to the second search unit; and a fourth step in which the second search unit calculates correlation characteristics based on the information about the code group candidates received from the 1-1 search unit and the 1-2 search unit, and selects a code group candidate having a highest correlation characteristic, wherein the second and third steps are performed to start correlation operations between some of the slots and the code group candidates while applying a receiver diversity function to the slots.

2. The method of claim 1, wherein, at the second and third steps, the 1-1 search unit and 1-2 search unit also transmit secondary synchronization channel signals, which have been received from the first and second antennas, respectively, to the second search unit when transmitting the information about the code group candidates.

3. The method of claim 1, wherein, at the fourth step, the second search unit uses a secondary synchronization channel signal having a higher correlation operation value if information about an identical code group candidate is received from both the 1-1 search unit and 1-2 search unit.

4. The method of claim 1, further comprising transmitting the information about the code group candidates received from the 1-1 search unit and 1-2 search unit to a determination unit.

5. The method of claim 4, wherein, at the fourth step, the determination unit transmits information about code group candidates to the second search unit if the information about the code group candidates is received from either the 1-1 search unit or the 1-2 search unit.

6. The method of claim 5, wherein, at the fourth step, the determination unit transmits a secondary synchronization channel signal of the 1-1 search unit or the 1-2 search unit to the second search unit when transmitting the information about the code group candidates to the second search unit.

7. The method of claim 6, wherein, at the fourth step, the determination unit transmits a secondary synchronization channel signal having a higher correlation operation value to the second search unit if information about an identical code group candidate is received from both the 1-1 search unit and the 1-2 search unit.

8. An apparatus for acquiring a code group in an asynchronous wideband code division multiple access (WCDMA) system, comprising:
  a primary synchronization channel search unit for informing a mobile station of a slot start point;
  a 1-1 search unit for, if primary synchronization channel slot timing synchronization is achieved, starting correlation operations between some of slots of the secondary synchronization channel received through a first antenna and code group candidates, and transmitting information about code group candidates having values exceeding a first threshold value to a determination unit;
  a 1-2 search unit for, if primary synchronization channel slot timing synchronization is achieved, starting correlation operations between some of slots of the secondary synchronization channel received through a second antenna and code group candidates, and transmitting information about code group candidates having values exceeding a second threshold value to the determination unit, the determination unit to transmit the information about the code group candidates received from the 1-1 search unit and 1-2 search unit to a second search unit; and
  the second search unit for calculating correlation characteristics based on the information about the code group candidates received from the determination unit, and selecting a code group candidate having a highest correlation characteristic,
  wherein the 1-1 search unit and 1-2 search unit start correlation operations between some of the slots and the code group candidates while applying receiver diversity function to the slots.

9. The apparatus of claim 8, wherein the determination unit transmits information about code group candidates to the second search unit if the information about the code group candidates is received from either the 1-1 search unit or the 1-2 search unit.

10. The apparatus of claim 9, where the determination unit transmits a secondary synchronization channel signal of the 1-1 search unit or the 1-2 search unit to the second search unit when transmitting the information about the code group candidates to the second search unit.

11. The apparatus of claim 10, wherein the determination unit transmits a secondary synchronization channel signal having a higher correlation operation value to the second search unit if information about an identical code group candidate is received from both the 1-1 search unit and 1-2 search unit.

* * * * *